United States Patent [19]

Gilman, Jr.

[11] Patent Number: 4,836,963
[45] Date of Patent: Jun. 6, 1989

[54] ROTATIONAL MOLDING METHOD

[75] Inventor: Llewellyn A. Gilman, Jr., Hampden, Me.

[73] Assignee: Old Town Canoe Company, Old Town, Me.

[21] Appl. No.: 53,542

[22] Filed: May 26, 1987

Related U.S. Application Data

[63] Continuation of Ser. No. 606,067, May 1, 1984, abandoned.

[51] Int. Cl.$^4$ .......... B29C 67/22; B29C 41/06
[52] U.S. Cl. .......... 264/45.7; 264/255; 264/310; 264/237; 425/435; 425/817 R
[58] Field of Search .......... 264/45.7, 45.1, 310, 264/255, 237; 425/435, 817 R

[56] References Cited

U.S. PATENT DOCUMENTS

| | | | |
|---|---|---|---|
| 2,736,925 | 3/1956 | Heisler et al. | 264/126 X |
| 2,893,057 | 7/1959 | Rekettye | 425/430 |
| 3,134,140 | 5/1964 | Knowles | 425/429 |
| 3,202,745 | 8/1965 | Ringdal | 264/113 |
| 3,391,823 | 7/1968 | Tijms | 264/45.7 X |
| 3,419,455 | 12/1968 | Roberts | 264/45.4 |
| 3,455,483 | 7/1969 | Inklaar | 264/45.7 X |
| 3,505,137 | 4/1970 | Kliene | 156/78 |
| 3,527,852 | 9/1970 | Thill | 264/45.4 |
| 3,541,192 | 11/1970 | Shapero et al. | 264/45.4 |
| 3,663,680 | 5/1972 | Ringdal | 264/294 |
| 3,676,037 | 7/1972 | Pivar | 425/435 |
| 3,703,348 | 11/1972 | Pivar | 425/173 |
| 3,703,571 | 11/1972 | Roberts | 264/45.4 |
| 3,810,727 | 5/1974 | Pivar | 425/144 |
| 3,813,462 | 5/1974 | Roberts | 264/45.4 |
| 3,822,980 | 7/1974 | Graeper | 425/429 |
| 3,825,395 | 7/1974 | Pivar | 425/435 |
| 3,841,821 | 10/1974 | Pivar | 425/434 |
| 3,843,285 | 10/1974 | Nitta et al. | 425/4 R |
| 3,885,016 | 5/1975 | Pivar | 264/269 |
| 3,914,105 | 5/1975 | Pivar | 425/435 |
| 3,914,361 | 10/1975 | Shiina et al. | 264/45.7 X |
| 3,936,565 | 2/1976 | Good | 264/45.7 X |
| 3,962,390 | 6/1976 | Mori | 264/45.4 |
| 3,997,649 | 12/1976 | Pivar | 264/310 |
| 4,022,564 | 5/1977 | Dawson | 425/430 |
| 4,032,600 | 6/1977 | MacAdams et al. | 260/897 B |
| 4,247,279 | 1/1981 | Masters | 425/430 |

FOREIGN PATENT DOCUMENTS 585395 2/1947 United Kingdom .

*Primary Examiner*—Philip Anderson
*Attorney, Agent, or Firm*—Fitzpatrick, Cella, Harper & Scinto

[57] ABSTRACT

An improved rotational molding method for making a laminated plastic structure of the type in which successive charges of particulate plastics are released in a mold cavity rotating in an oven to coalesce successively along the mold cavity wall after which the mold is removed from the oven for cooling. By removing the rotating mold from the oven prior to completion of the formation of the inside layer, cooling of the outside of the mold will be concurrent with coalescence of the inside layer. This shortens the time of the molding cycle and reduces warping problems.

10 Claims, 2 Drawing Sheets

```
┌─────────────────────────────────────────────────────────────────┐
│ PLACE INITIAL CHARGE OF PARTICULATE PLASTIC INTO MOLD CAVITY    │
│ AND PARTICULATE PLASTIC CHARGES #2 AND #3 INTO INSULATED        │
│ BOXES ADJACENT TO MOLD CAVITY                                   │
└─────────────────────────────────────────────────────────────────┘
                              ↓
┌─────────────────────────────────────────────────────────────────┐
│                      CLOSE MOLD CAVITY                          │
└─────────────────────────────────────────────────────────────────┘
                              ↓
┌─────────────────────────────────────────────────────────────────┐
│            BEGIN ROTATING MOLD AND CONTINUE ROTATING            │
└─────────────────────────────────────────────────────────────────┘
                              ↓
┌─────────────────────────────────────────────────────────────────┐
│                  MOVE ROTATING MOLD INTO OVEN                   │
└─────────────────────────────────────────────────────────────────┘
                              ↓
┌─────────────────────────────────────────────────────────────────┐
│ RELEASE PARTICULATE PLASTIC CHARGE #2 AFTER INITIAL CHARGE      │
│ HAS COALESCED AS OUTER LAYER                                    │
└─────────────────────────────────────────────────────────────────┘
                              ↓
┌─────────────────────────────────────────────────────────────────┐
│ RELEASE PARTICULATE PLASTIC CHARGE #3 AFTER PARTICULATE         │
│ PLASTIC CHARGE #2 HAS COALESCED AS INSULATING LAYER             │
└─────────────────────────────────────────────────────────────────┘
                              ↓
┌─────────────────────────────────────────────────────────────────┐
│ REMOVE ROTATING MOLD FROM OVEN BEFORE PARTICULATE PLASTIC       │
│ CHARGE #3 HAS COALESCED AS INSIDE LAYER                         │
└─────────────────────────────────────────────────────────────────┘
                              ↓
┌─────────────────────────────────────────────────────────────────┐
│              BEGIN COOLING OF CLOSED ROTATING MOLD              │
└─────────────────────────────────────────────────────────────────┘
                              ↓
┌─────────────────────────────────────────────────────────────────┐
│ OPEN MOLD CAVITY AFTER PARTICULATE PLASTIC CHARGE #3 HAS        │
│ COALESCED AS INSIDE LAYER AND CONTINUE COOLING                  │
└─────────────────────────────────────────────────────────────────┘
                              ↓
┌─────────────────────────────────────────────────────────────────┐
│        STOP ROTATION OF MOLD AND REMOVE MOLDED PART             │
└─────────────────────────────────────────────────────────────────┘
```

FIG. 1

ROTATIONAL MOLDING METHOD

This application is a continuation of application Ser. No. 606,067, filed May 1, 1984, now abandoned.

FIELD OF THE INVENTION

This invention is related to the manufacture of molded plastic laminated structure and, more specifically, to rotational molding methods for manufacture of such laminated structures.

BACKGROUND OF THE INVENTION

Plastic laminates have been useful for a variety of products because of their relative light weight, good strength characteristics, resistance to corrosion, and low cost. A variety of methods have been developed for making laminated structures according to a pre-determined shape.

One particularly useful method is rotational molding, in which the laminate is made even while the molded structure is being formed. Rotational molding is advantageous in the manfacture of large structures such as boat hulls and vehicle bodies.

A typical rotational molding apparatus for making a molded laminated structure, such as a boat hull, would include a mold assembly having means to rotate about two axes, an oven into which the mold assembly can travel and in which it can "rock and roll" about the two axes. The apparatus would have one or two insulated boxes positioned to release particulate plastics into the mold cavity while it rocks and rolls in the oven.

The molding method carried out with this apparatus would include the following steps: First, the insulated boxes would be filled with the appropriate plastic particulates, chosen to provide the desirable laminate qualities. For example, one of the boxes could be filled with the appropriate charge of a plastic with a blowing agent, while the other could have a plastic without a blowing agent. Then, another charge of plastic particulate materail could be placed loosely in the mold cavity, which would then be closed.

The mold assembly would be moved into the oven and the rocking and rolling action would begin. The oven would heat the mold assembly and mold, eventually causing the mold cavity wall to reach a temperature causing melting of the particulates sliding thereacross to start forming a layer in contact with the cavity wall. This layer would get thicker as the rotational movement continues, and cross-linking of the material would begin.

At some point before cross-linking is completed, one of the insulated boxes would be opened to release the particulate plastic and blowing agent. Melting of the new material would begin as it contacted the hot outer layer, and the new material would form as a second layer intimately bonded to the first layer. The second layer would become a foam layer by virtue of the action of the blowing agent.

After substantial completion of the formation of the foam layer, but before completion thereof, the other insulated box would be opened to release the remaining charge of particulate plastic. This material would begin to melt by viture of the heat of the foam layer, and would intimately bond with the foam layer and continue to coalesce to form an inside layer.

After coalescence of the inside layer, the mold assembly would be removed from the oven and cooling would begin. Cooling may be carried out by use of fans blowing on the mold assembly, which may continue its rotational movement to allow the fanned air to contact the outer surfaces of the mold relatively evenly. During cooling, while the molded piece remains in the mold, the mold cavity may or may not be opened by opening doors exposing the mold cavity to the cooling air.

After cooling, the molding piece is stripped from the mold, and the process can begin again.

There are many variations possible in rotational molding, including the use of other heating methods, other cooling methods, and many different types of equipment. Many advances have been made in rotational molding, and a number of United States patents have been issued, including:

| | | |
|---|---|---|
| 3,936,565 | 3,391,823 | 3,663,680 |
| 4,247,279 | 4,022,564 | 3,419,455 |
| 3,813,462 | 3,703,571 | 3,527,852 |
| 3,914,361 | 3,962,390 | 3,843,285 |
| 3,505,137 | 3,541,192 | 2,893,057 |
| 3,134,140 | 3,822,980 | 3,676,037 |
| 3,703,348 | 3,810,727 | 3,825,395 |
| 3,841,821 | 3,885,016 | 3,914,105 |
| 3,997,649. | | |

There are certain problems or shortcomings with rotational molding methods, particularly when used to mold various large items such as boat hulls. For example, warping can occur during cooling in the mold, particularly if there is relatively uneven cooling as is the case when a mold cavity is opened to allow faster cooling. In such cases, the outer surface of the molded piece, which is against the mold wall, will cool more slowly than the inner surface of the molded piece, which is exposed to the cooling air when the mold cavity is opened for cooling.

One possible solution to this is to keep the mold cavity closed during cooling such that the difference in the rate of cooling is not as great as it is when the cavity is opened. However, this means that the cooling cycle will be lengthened, delaying the time the mold will be available for molding the next piece.

Another very significant shortcoming with certain types of rotational molding methods, such as that described above, is the large amount of heat which is required. The amount of heat required is very substantial for two reasons—the oven is very large to accommodate the rocking and rolling mold assembly and the time required for the process is lengthy. If the laminate has several layers, as may be necessary to achieve the desired properties, the time necessary for the process is extended.

Shortening the in-oven cycle time would yield substantial savings in energy costs and makes the rotational molding equipment more efficient in terms of output of pieces per unit of time.

Substantial improvements have been needed to address the problems and drawbacks of rotational molding discussed above.

SUMMARY OF THE INVENTION

This invention is an improved rotational molding method for making laminated plastic structures of the type in which successive charges of particulate plastics are released in a mold cavity rotating in an oven to coalesce successively along the mold cavity wall after which the mold is removed from the oven for cooling.

The rotating mold is removed from the oven prior to completion of the coalescing of the inside layer, so that part of the cooling process is made concurrent with such coalescing process. This considerably shortens the time of the molding cycle.

This invention is based in part on the recognition that, after the temperature level inside the mold cavity has risen and a portion of the molded laminate has been formed, such portion of the laminate can act as an insulating barrier to maintain the heat. It has been further recognized that by this means the heat level in the mold cavity will be maintained sufficiently to allow coalescence of the particles which will form the inside layer of the laminate even thougth the mold is removed from the oven and cooling of the mold has started.

The method of this invention includes the following steps:

First, a mold assembly is rotated in a heated oven such that a contained charge of particulate plastic material within the mold cavity coalesces along the cavity wall to form an insulating layer. This step may or may not be preceded by a prior rotational molding step to form an outer layer in direct contact with the mold cavity wall. Such an outer layer is part of a preferred three-layer laminate. In such preferred cases, the rotational movement in the oven will continue as the contained charge is released to begin formation of the insulating layer in intimate contact with the outer layer. The insulating layer is preferably a foam layer.

Then a subsequent charge of particulate plastic material is released into the mold cavity while the rotating continues. Rotating continues until such subsequent charge coalesces along the insulating layer to form an inside layer of the laminate. However, the mold assembly is removed prior to completion of the coalescing of such subsequent charge such that cooling of the mold assembly can begin even while coalescing of such subsequent charge is in progress.

Cooling begins with the mold cavity closed to retain the heat level therein. Cooling may be carried out by the use of fans blowing air on the outside of the mold. This allows the mold to cool as heat escapes through the mold, eventually lowering the temperature of the outer layer of the laminate and starting to lower the temperature of the insulating layer. However, these layers serve to retain heat in the mold cavity and keep the temperature of the inner surface of the insulating layer sufficient to allow coalescence of the inside layer to proceed.

The length of the period of concurrent cooling and coalescing depends on the insulating qualities of the already-formed layer or layers. If the insulating qualities of the already formed layer or layers are good, then the period of concurrent cooling and coalescing can be substantial.

For example, if a foam layer or part of a foam layer is already formed, then a substantial period of concurrent coalescing of the inside layer and cooling of the mold would be possible because of the good insulating qualities of the foam. The thickness of the already-formed layer or layers is another factor dictating the maxmium length of the period of concurrent cooling and coalescing. Thicker insulating layers allow longer periods of concurrency, and therefore allow the total molding cycle time to be shorter.

As noted, a preferred laminated structure has an outer layer which is formed in contact with the mold cavity wall by a first rotational molding step after which the charge referred to above as the contained charge is released into the mold cavity while rotation of the mold assembly in the heated oven continues. In such cases, both the outer layer and the insulating layer serve an insulating function, although the layer referred to as the insulating layer will have greater insulating value if it is a foam, as is preferred.

The step of removing the mold from the heated oven can occur early or late in the period during which the inside layer is being formed, depending upon the factors already noted. In some cases, if the insulating qualities of the insulating layer are particularly good such that the temperature of the mold cavity remains high, the mold can be removed from the oven even before release of the final charge to form the inside layer.

Another factor to consider in maximizing the time saved by the method of this invention is the temperature level at which the particulate plastic of the last charge melts. If its melting temperature is low relative to the temperature in the mold cavity toward the end of coalescing of the insulating layer, then a longer period of concurrency is possible. In such cases, the falling temperatures within the closed mold cavity would remain sufficiently high to allow coalescence for a longer period of time after the mold assembly has been removed from the oven.

The method of this invention lessens the tendency of large rotational molded laminated articles to warp during cooling. When the mold cavity is opened, the inside layer of the laminate is exposed directly to the cooling medium (air), while the outer layer remains in contact with the mold wall, which shields it from the cooling air. In prior rotational molding methods, when the mold was opened immediately after removal from the oven, the temperature differential across the laminate was very large, which is believed to make warping more likely.

However, in the method of this invention the early cooling of the outer layer of the laminate, prior to completion of the formation of the inside layer and prior to opening of the mold cavity, reduces the temperature differential across the laminate when the mold ciavty is opened for final cooling. This cooling headstart is believed to be the reason that warping problems are reduced with the method of this invention.

OBJECTS OF THE INVENTION

An object of this invention is to improve rotational molding methods used for making laminated articles.

Another object of this invention is to provide an improved rotational molding method requiring less time.

Another object of this invention is to provide an improved rotational molding method lessening the problem of warping associated with rotational molding of large laminated pieces.

These and other important objects will be apparent from the following further description and from the accompanying drawings wherein:

FIG. 1 is a flow chart showing the steps of a preferred method in accordance with this invention.

FURTHER DESCRIPTION OF PREFERRED METHODS

Figure 2:
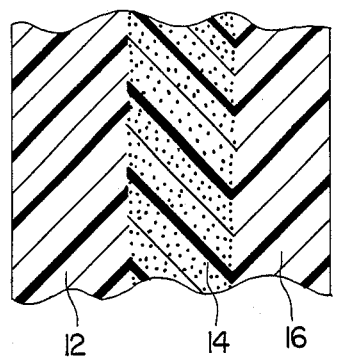
FIG. 2 is a fragmentary sectional view of a laminate illustrating its layers.

FIG. 2 illustrates a three-layered laminate of a type useful for boat hulls such as canoes and kayaks. The laminate has an outer layer 12, a middle insulating layer 14, and an inside layer 16. Layers 12 and 16 are relatively dense plastics while insulating layer 14 is a foam. Layers 12 and 14 and layers 14 and 16 are tightly interconnected at their respective interfaces by virture of the rotational molding process.

Figure 3:
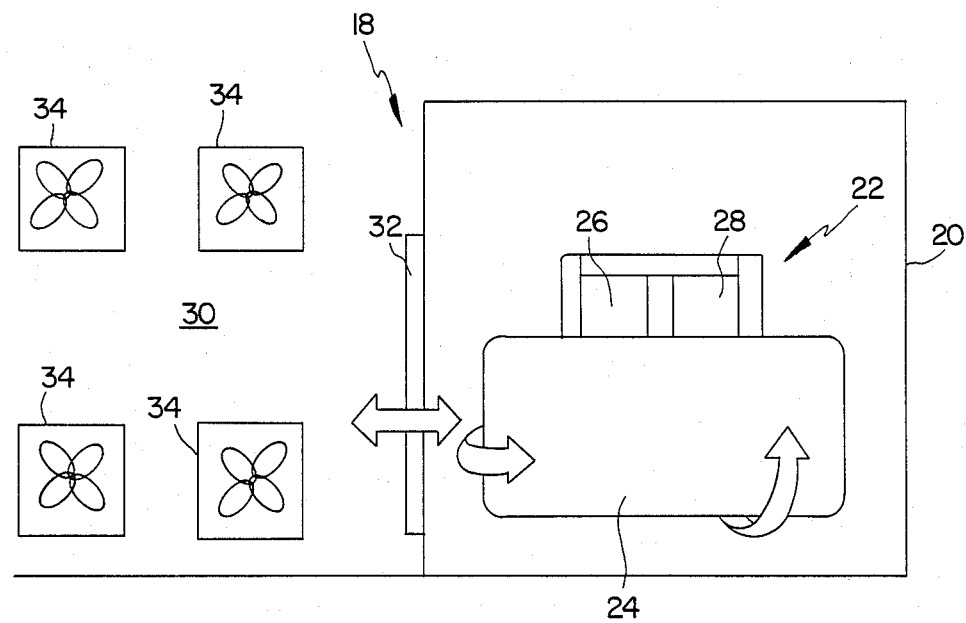
FIG. 3 is a schematic view of rotational molding apparatus on which the method of this invention can be practiced.

FIG. 3 illustrates rotational molding apparatus 18 on which the method of this invention may be practiced. Apparatus 18 includes an oven 20 in which part of the laminate forming operation occurs. Shown within oven 20 is a mold assembly 22 including mold 24 and insulating boxes 26 and 28. As indicated by the curved arrows, the mold undergoes rotational movement about two axes. Such action is possible both in oven 20 and in the outside work and cooling area 30, as well as in areas therebetween. Means not shown provide the rotational movement.

Means not shown also move mold assembly 22 between oven 20 and outside area 30, in the directions shown by the straight arrow, when the oven door 32 is opened. Toward the end of the rotational molding cycle, when molding apparatus 22 is in outside area 30, fans 34 blow cooling air against mold assembly 22. Fans 34 blow cooling air into mold 24 when the mold cavity therein has been opened (by opening means not shown).

The apparatus required for the method of this invention is known in the prior art. FIG. 3 is included merely to help make the descriptions herein clearer.

With mold assembly 22 in area 30, a second charge of plastic particles (sometimes referred to as the "contained" charge) is loaded into insulating box 26 and a third charge (sometimes referred to as the "subsequent" charge) is loaded into insulating box 28. A first charge is placed directly into the mold cavity and the mold cavity is closed.

Mold 24 begins its rotational movements, which are such as to cause the particulate plastic material to pass repeatedly over the wall of the mold cavity. Mold assembly 22 is then moved into oven 20 through open door 32, which is immediately closed. The rotational movement could begin immediately after mold assembly 22 is moved into oven 20.

Heat in oven 20 heats mold assembly 22 including mold 24 and the wall of the mold cavity. When the temperature of the mold cavity wall rises to the melting point of the first charge, then the first charge will begin to melt and coalesce on the mold cavity wall to form outer layer 12 of the laminate.

After coalescing of the first charge in this manner and before cross-linking of outer layer 12 is completed, the second charge will be released from insulating box 26 into the mold cavity while rotation of mold assembly 22 continues in oven 20. The temperature of outer layer 12 is high enough to start the melting of the second charge. The second charge forms middle layer 14 which is referred to as the "insulating" layer. Because the second charge included a blowing agent, middle layer 14 develops as a foam. Middle layer 14 will be joined intimately to outer layer 12.

After coalescence of the second charge as insulating layer 14, the third charge is released from insulating box 28 into the mold cavity while rotation of mold assembly 22 continues in oven 20. The temperature of insulating layer 14 is high enough to start the melting of the third charge.

Before completion of coalescing of the third charge as inside layer 16, the rotating mold assembly 22 is removed from oven 20 when door 32 is opened. Rotation continues in cooling area 30 as fans 34 blow air at mold assembly 22. During such early portion of the cooling time, the mold cavity remains closed and coalescing of the third charge continues. Inside layer 16 formed by the coalescing third charge will be intimately joined with insulating layer 14.

When coalescing of the third charge is completed, the mold cavity is opened and rotation of mold assembly 22 continues as fans 34 continue to blow air on the assembly. The cooling accelerates by virtue of the fact that the mold cavity is now exposed to cooling air. However, before cooling air enters the mold cavity and contacts inside layer 16 the temperature of outer layer 12 has already been reduced. The cooling is completed relatively quickly after inside layer 16 is formed, since the cooling process had a headstart while the third charge was coalescing.

In making a three-layered laminated canoe of medium size, the following materials can be used:

The outer layer material is a cross-linkable high density polyethylene powder such as CL 100 ground to a 35 mesh, which is available from Phillips Chemical Company, Bartlesville, OK. For a canoe of medium size approximately 22 pounds of this material is used to form an outer layer of sufficient thickness (about 2.5 mm) and strength. Pigments may be added to this resin.

The insulating layer material (about 8 mm) is a natural high density polyethylene powder such as Phillips #955. About 20 pounds of this material is used. Blended with this resin is about 0.625% by weight of Celogen azodicarbonamide, a blowing agent in powder form supplied by Uniroyal Corporation, Naugatuck, CT.

The inside layer material is a cross-linkable high density polyethylene powder such as Sclairlink 8000 G, made by Dupont of Canada. About 22 pounds of this resin is used to form an inside layer of sufficient thickness (about 2.5 mm) and strength. Pigments may be added to this resin.

A great variety of acceptable particulate resins may be used in the method of this invention. The choice of resins would be known to those skilled in the art who are made familiar with this disclosure.

While in the foregoing specification this invention has been described in relation to certain preferred embodiments and many details have been set forth for purpose of illustration, it will be apparent to those skilled in the art that the invention is susceptible to additional embodiments and that certain of the details described herein can be varied considerably without departing from the principles of the invention.

What is claimed is:

1. A rotational molding method for making a laminated plastic structure in a mold assembly mold cavity, comprising:

rotating the mold assembly containing a first charge of particulate thermoplastic material within the mold cavity within an oven heated to a temperature to coalesce the thermoplastic material along the cavity wall to form a first layer;

releasing into the mold cavity a second charge of a particulate thermoplastic material while continuing rotation of the mold assembly within the oven;

continuing such mold assembly rotation within the oven until the second charge begins to coalesce along the first layer to form a second layer; and removing the mold assembly from the oven for cooling prior to completion of the coalescence of said second charge;

whereby the cooling of the mold assembly and the first layer is concurrent with completion of the coalescence of the second layer so as to shorten the elasped time during the molding process.

2. The method of claim 1 wherein said first charge includes a blowing agent such that the first layer is a foam, whereby the mold cavity will retain sufficient heat to allow concurrent cooling and coalescing for an extended period.

3. The method of claim 1, further comprising the step of forming an outer layer of thermoplastic material in contact with the mold cavity wall, including a first rotational molding step of rotating particulate thermoplastic material within the heated oven, after which said first charge is released into the mold cavity while rotation of the mold assembly in the heated oven continues.

4. The method of claim 3 wherein first charge includes a blowing agent such that the first layer is a foam, whereby the mold cavity will retain sufficient heat to allow concurrent cooling and coalescing for an extended period.

5. A rotational molding method for making a laminated plastic structure in a mold assembly mold cavity, comprising:

rotating the mold assembly containing a first charge of particulate thermoplastic material within the mold cavity within an oven heated to a temperature to coalesce the thermoplastic material along the cavity wall to form a first layer; removing the mold assembly from the oven while continuing rotation of said mold assembly;

releasing into the mold cavity a second charge of a particulate thermoplastic material subsequent to removing the mold assembly from the oven, while continuing rotation of said mold assembly; and continuing rotation of said mold assembly until the second charge coalesces along the first layer to form a second layer;

whereby cooling of the mold assembly and the first layer is concurrent with the coalescence of the second layer to considerably shorten the time elasped during the molding process.

6. The method of claim 5 wherein said first charge includes a blowing agent such that the first layer formed is a foam, whereby the mold cavity will retain sufficient heat to allow concurrent cooling and coalescing for an extended period.

7. The method of claim 5, further comprising the step of forming an outer layer of thermoplastic material in contact with the mold cavity wall, including a first rotational molding step of rotating particulate thermoplastic material within the heated oven, after which said first charge is released into the mold cavity while rotation of the mold assembly in the heated oven continues.

8. The method of claim 7 wherein said first charge includes a blowing agent such that the first layer formed is a foam, whereby the mold cavity will retain sufficient heat to allow concurrent cooling and coalescing for an extended period.

9. A rotational molding method for making a laminated plastic boat hull in a mold assembly mold cavity, comprising:

rotating the mold assembly containing a first charge of particulate thermoplastic material within the mold cavity within an oven heated to a temperature to coalesce the first charge along the cavity wall to form a first layer;

releasing into the mold cavity a second charge of a particulate thermoplastic material that includes a blowing agent while continuing rotation of the model assembly within the oven;

continuing such mold assembly rotation within the oven until the blowing agent foams and the second charge coalesces along the first layer to form a second layer;

releasing into the mold cavity a third charge of particulate thermoplastic material while continuing rotation of the mold assembly within the oven;

removing the mold assembly from the oven prior to completion of the coalescence of the third charge;

air cooling the mold assembly after removal of the mold assembly from the oven while continuing mold assembly rotation during continued coalescence of the third charge; and opening the mold assembly after coalescence of the third charge is completed while continuing to air cool the mold assembly so as to expose the mold cavity to cooling air.

10. The rotational molding method as in claim 9, wherein the air cooling step comprises blowing air against the mold assembly.

* * * * *